United States Patent

Jones

[15] 3,688,829

[45] Sept. 5, 1972

[54] REMOVING SCALE FROM OIL WELLS

[72] Inventor: Loyd W. Jones, Tulsa, Okla.

[73] Assignee: Amoco Production Company, Tulsa, Okla.

[22] Filed: May 24, 1971

[21] Appl. No.: 146,500

[52] U.S. Cl. ............... 166/305 R, 166/304, 166/307, 166/312, 252/8.55 B
[51] Int. Cl. ......................... E21b 37/00, E21b 43/27
[58] Field of Search ...... 166/307, 304, 311, 312, 300, 166/305 R; 252/8.55, 83, 84

[56] References Cited

UNITED STATES PATENTS

| | | | |
|---|---|---|---|
| 2,584,017 | 1/1952 | Dvorkovitz | 252/156 |
| 2,877,848 | 3/1959 | Case | 252/8.55 B |
| 3,482,636 | 12/1969 | Crowe | 166/307 |
| 3,563,315 | 2/1971 | Claylor | 166/304 |

*Primary Examiner*—Robert L. Wolfe
*Attorney*—Paul F. Hawley and Arthur McGray

[57] ABSTRACT

A workover process for removing calcium sulfate scale from oil wells includes introducing into the well and into contact with the scale an aqueous solution of sodium or potassium gluconate and sodium or potassium hydroxide. The weight ratio of gluconate to hydroxide is between about 2:1 and about 5:1 to give a direct solvent action. The concentration is between about 10 percent and about 30 percent by weight. The solvent can be used in connection with other workover steps such as the use of string shots, bailing, use of organic solvents such as paraffin solvents, acidizing, fracturing, and use of scale inhibitors.

7 Claims, No Drawings

REMOVING SCALE FROM OIL WELLS

When the oil-producing rate of an oil well declines, a workover job is performed to increase production. The workover may include bailing out accumulated scale and other solids, acidizing, fracturing, use of paraffin solvents, or scale solvents, and the like. Removal of calcium sulfate scale from wells has presented problems, particularly when the scale is in a massive, dense, impermeable form, or when the scale is deposited in pores and other openings within the formation.

In removing scale from surface equipment, the solvent can be heated, circulated, filtered, and analyzed to determine whether it is spent. Further the amount of scale and thus the minimum amount of solvent needed can be estimated. In a well, most of these manipulations are difficult or impossible. In addition, the amount, nature, and location of the scale in surface equipment can usually be rather accurately determined. In a well, on the other hand, the cause of the reduced oil-producing ability is frequently unknown. Not only are the amount, nature, and location of the scale uncertain, but sometimes it is not even known whether scale is present at all. On the surface, where conditions are accurately known and process steps can be easily manipulated, rather expensive chemicals can be used since they can be fully utilized. For example, U. S. Pat. No. 2,396,938 Bersworth suggests that an expensive chemical, ethylene diamine tetraacetic acid (EDTA), be used to remove boiler scale. This is a very expensive chemical. Its use has been rather limited in wells where conditions are unknown. In oil wells, the chemicals are usually much less expensive ones, such as hydroxy acetic acid (glycolic acid), as mentioned in U.S. Pat. No. 3,547,194 Morine, or even simply sodium hydroxide.

Most of the less expensive chemicals, such as glycolic acid, are not really calcium sulfate scale solvents. They are known as converters. They swell and disintegrate the calcium sulfate scale and convert it into a form which can be removed by a hydrochloric acid treatment. Use of converters is objectionable because of the expense of the hydrochloric acid treatment which is required. Their use is also objectionable because the converted solid quickly blankets the remaining unconverted calcium sulfate, decreasing or preventing further action by the converter. This problem is particularly serious if the scale is a dense, massive, impermeable scale rather than a loose mass of fine crystals. If the scale is within the pores of the formation, the finely divided converted scale particles not only can blanket the remaining scale, but can also bridge and seal the pores themselves. Use of a solvent rather than a converter is obviously desirable to eliminate the adverse effects of the converted scale particles. A direct solvent less expensive, but at least as effective as EDTA, is also required if scale in wells with all their unknown conditions and difficulties of control are to be effectively treated.

Results of using prior-art chemicals for treating loose calcium sulfate scale crystals from a well in West Texas are shown in Table I. In this test, about 5 grams of scale was weighed into a 2-ounce bottle. About 10 milliliters of the solvent per gram of scale was then placed in the bottle. A lid was applied and the bottle was shaken and placed in an oven at about 100° F. The bottle was shaken occasionally during its 24-hour stay in the oven. The bottle was then removed and its contents filtered using a Millipore filter apparatus. The filter element was a 47-millimeter diameter, 0.45 micron cellulose ester type. The residue from this first treatment was then treated with about 50 milliliters of 15 percent hydrochloric acid solution for about an hour at 100° F. The residue from the acid treatment was then filtered, dried and weighed.

TABLE I

| Test No. | Solvent Material | Ratio[a] | Wt.% | | Percent Dissolved by solvent | by solvent and acid |
|---|---|---|---|---|---|---|
| 1 | EDTA Salt[b] | | 20 | | 59.5 | 64.4 |
| 2 | EDTA Salt NaOH | 10:1 | 20 | | 64.9 | 71.3 |
| 3 | EDTA Salt NaOH | 6:1 | 20 | | 65.7 | 79.3 |
| 4 | EDTA Salt NaOH | 3:1 | 20 | | 69.8 | 91.4 |
| 5 | NaOH | | 20 | | 43.5 | 96.1 |
| 6 | Sodium Glycolate | | 20 | gained | 63.2 | 78.1 |
| 7 | Sodium Glycolate NaOH | 3:1 | 20 | gained | 28.2 | 99.7 |
| 8 | Sodium Glycolate NaOH | 1:1 | 20 | | 41.0 | 92.4 |
| 9 | Sodium Citrate[c] | | 20 | gained | 189.2 | 95.4 |
| 10 | Sodium Citrate NaOH | 3:1 | 20 | | 82.0 | 97.0 |
| 11 | Sodium Citrate NaOH | 2:1 | 20 | | 71.2 | 99.7 | a. Ratio of Salt to NaOH by weight.
b. Tetrasodium Salt of Ethylene Diamine Tetraacetic Acid.
c. Trisodium Citrate.

Test 1 in Table I shows that solutions of EDTA salts are direct solvents for calcium sulfate scale. Tests 2 to 4 indicate that a little excess sodium hydroxide does improve the solvent action as suggested by Bersworth. However, the direct solvent action (without a following acid treatment) is not as good as might be desired. The solvent is rather expensive, particularly for use in wells where it is not even known whether a scale problem exists.

Test 5 shows the rather surprising direct solvent action of sodium hydroxide. The high-acid solubility after treatment with sodium hydroxide indicates the converter action of sodium hydroxide. Sodium hydroxide has been used successfully as a converter in some areas, while in others it has not been very successful. The reason for the wide variations in results is not known.

Tests 6 to 8 show the effects of one of the most successful converters, glycolic acid. Apparently, the glycolic acid becomes chemically associated in some way with the scale, actually increasing the weight of the scale. This probably explains the swelling and disintegrating action of the converters. By carefully adjusting the ratio of sodium glycolate to sodium hydroxide, some direct solvent action can be obtained as shown in Test 8. The predominant action, however, is as a converter with the consequent tendency of the converted scale to protect the unconverted deposits and to plug formation pores. This explains the necessity of alternating sodium glycolate and acid solutions several times to remove scale from many wells. Such a process is very expensive. In addition, the repeated acidizing is undesirable for technical reasons. For example, each time acid is pumped through the well tubing, corrosion takes place. Also, the acid not only attacks the converted scale, but also dissolves the formation and enlarges the well bore. In some cases, the repeated acidizing has opened channels into water zones, greatly increasing water production.

Test 9 shows the very strong association of sodium citrate with the scale, almost tripling the weight of the scale. Tests 10 and 11 show the surprisingly strong direct solvent action which can be obtained by using the proper ratio of citrate to caustic soda. There are two objections to using citrates. One is the uncertainty whether the materials will act as converters or solvents. The other is the high cost of citric acid.

With the above observations in mind, an object of this invention is to provide a process using a single solution for removing calcium sulfate deposits from wells. Another object is to provide such a process which does not form a protective coating on the scale. Still another object is to provide a process which employs an inexpensive direct solvent for calcium sulfate scale. An additional object is to provide a process which is effective in attacking massive impermeable deposits of calcium sulfate in wells. Still other objects will be apparent from the following description and claims.

SUMMARY OF THE INVENTION

In general, I accomplish the objects of my invention by treating a calcium sulfate deposit in a well with an aqueous solution containing sodium gluconate and sodium hydroxide in a weight ratio of about 3:1 and a total concentration of about 20 percent.

The effectiveness of this treatment is shown by the data in Table II. In the tests reported in Table II, the procedure and the scale sample were the same as described in connection with Table I.

Table II

| Test No. | Solvent Material | Ratio | Wt. % By Solvent | Percent Dissolved by solvent | Percent Dissolved by solvent and acid |
|---|---|---|---|---|---|
| 5 | NaOH | | 20 | 43.5 | 96.1 |
| 12 | Sodium Gluconate NaOH | 2:1 | 20 | 72.8 | 88.7 |
| 13 | Sodium Gluconate NaOH | 3:1 | 20 | 89.4 | 94.2 |
| 14 | Sodium Gluconate NaOH | 5:1 | 20 | 71.6 | 76.8 |
| 15 | Sodium Gluconate | | 20 | 27.4 | 35.7 |
| 16 | Sodium Gluconate NaOH | 3:1 | 10 | 48.6 | 57.3 |
| 17 | Sodium Gluconate NaOH | 3:1 | 30 | 91.3 | 96.7 |
| 18 | Potassium Gluconate | | 20 | 22.7 | 31.1 |
| 19 | Potassium Gluconate NaOH | 3:1 | 20 | 66.5 | 82.7 |

The most important tests in Table II are Tests 13 and 17. It will be noted that treatment with this solvent alone at a 20 or 30 percent concentration dissolves about 90 percent of the calcium sulfate. This value is so high that no other treatment is needed. Tests 12 to 17 all indicate that sodium gluconate with or without sodium hydroxide has little, if any, tendency to convert the calcium sulfate to an acid-soluble form. This seems particularly true when it is considered that the scale itself was not completely pure calcium sulfate. About 15 percent was acid-soluble to start with. Within rather critical concentration ranges and within rather critical ratios of sodium gluconate to caustic, however, no further treatment may be required. A major advantage is that the direct action of the solvent on the calcium sulfate itself removes the surface without leaving a coating to inhibit further action of the solvent. As a result, the solvent is unusually effective in dissolving massive impermeable deposits, even anhydrite beds themselves.

The ability of the sodium gluconate-caustic combination to attack massive impermeable chunks of scale is shown in Table III. The tests in this case were run substantially the same as in the tests of Table I with a few differences. The main difference was that the scale was in the form of impermeable solid chunks rather than the loose crystals used in the tests of Table I and Table II. In addition, the time of contact with the solvent was 20 hours instead of 24 hours, and the residue after contact with the solvent was water-washed before drying and weighing.

TABLE III

| Test No. | Solvent | Percent Dissolved by solvent | by solvent & acid |
|---|---|---|---|
| 20 | Sodium Gluconate NaOH | 74.1 | 77.5 |
| 21 | Commercial Solvent A | 24.2 | 30.8 |
| 22 | Commercial Solvent B | 44.5 | 50.6 |
| 23 | Commercial Solvent C | 35.3 | 40.1 |
| 24 | Commercial Solvent D | 15.5 | 24.5 |

The sodium gluconate-to-caustic ratio in Test 20 was 3:1, and the total concentration was 20 percent by weight. Commercial solvent "B" is said to be an approximately neutral sodium salt of ethylene diamine tetraacetic acid. Commercial solvent "D" is thought to be principally the neutral salt of hydroxy acetic acid and is probably the most widely used commercial converter. The chemical natures of commercial solvents "A" and "C" are not known. The concentrations of commercial inhibitors were those recommended for field use.

Probably the most impressive item in Table III is Test 24. As previously noted, solvent "D" is probably the most widely used of the commercial scale converters. It is very effective in removing relatively loose deposits of calcium sulfate scale when followed by an acidizing treatment. Test 24 shows, however, that the layer of converted scale on an impermeable chunk prevents action by the converter on anything but the outer surface of such massive impermeable deposits. This explains the need in some cases to use several alternations of solvent "D" and acid to remove very much of such massive impermeable deposits. In Test 22, solvent "B", the ethylene diamine tetraacetic acid salt, shows a much better dissolving action on the chunks of scale because it seems to work more as a direct solvent than as a converter. In Test 20, the combination of sodium gluconate and caustic, when used in the correct ratio and concentration ranges, does a much more effective job of dissolving the chunks of scale than any of the solvents now in commercial use.

Since the compositions of the commercial scale converters and solvents were not accurately known, tests were made using chunks of scale and known chemicals. Results are shown in Table IV. The test procedure in this case was the same as that described in connection with Table I. The concentrations of chemicals in the solvents was 20 percent in all cases.

TABLE IV

| Test No. | Material | Solvent Ratio | Percent Dissolved by solvent | by solvent and acid |
|---|---|---|---|---|
| 25 | Sodium Gluconate | — | 18.2 | 26.2 |
| 26 | Sodium Gluconate NaOH | 3:1 | 62.9 | 68.0 |
| 27 | Sodium Glycolate | —gained | 10.3 | 42.8 |
| 28 | Sodium Glycolate NaOH | 3:1 | 11.6 | 68.3 |
| 29 | Sodium Citrate | — | 4.3 | 15.9 |
| 30 | Sodium Citrate NaOH | 3:1 | 54.7 | 71.7 |
| 31 | Sodium EDTA | — | 48.3 | 56.3 |
| 32 | Sodium EDTA NaOH | 3:1 | 39.5 | 54.0 |

The difference between Test 20 in Table III and Test 26 in Table IV is probably due principally to the difference in the scale used in the two tests. Both were from wells in West Texas but the wells were in different fields. There are often rather wide variations in scales even from wells in the same field.

Tests 31 and 32 show the sodium salt of ethylene diamine tetraacetic acid is a good solvent for calcium sulfate scale as reported in U.S. Pat. No. 2,396,938 Bersworth. It is apparent from Test 26, however, that sodium gluconate with the proper amount of caustic is better. The sodium gluconate solution costs only a small fraction of the cost of the solution of the salt of ethylene diamine tetraacetic acid.

Test 27 with the converter, sodium glycolate, produced a deposit on the surface of the chunk which inhibited solution of the chunk even by a subsequent acid treatment.

Sodium citrate is a well known sequestering agent, so the results of Test 29 are rather surprisingly poor. Results of adding a little caustic to the sodium citrate are rather surprisingly good. In a single-step treatment, however, it is apparent that sodium gluconate with caustic is even better. Of equal importance, sodium gluconate is much less expensive than sodium citrate.

The combined action of the sodium gluconate and caustic is not well understood. Obviously, it is not simply a matter of a chelating or sequestering action since the various agents of this type behave so differently. In addition, it has been found that the caustic-sodium gluconate combination is not very effective as a solvent for barium sulfate or calcium carbonate. If a simple chelating action was involved, these scales should also be dissolved. Considering the data in the tables, however, it is apparent that whatever the explanation, the caustic-sodium gluconate combination within narrow ratio and concentration limits is a more effective calcium sulfate solvent than anything previously proposed.

With one possible exception, there seemed to be no alternates to the sodium gluconate or caustic soda. This one exception is the use of potassium gluconate instead of sodium gluconate and potassium hydroxide in place of sodium hydroxide. It has been previously noted that in some areas potassium hydroxide is a more effective scale converter than sodium hydroxide, so it is possible that in some areas potassium gluconate and potassium hydroxide might be preferable to sodium gluconate and sodium hydroxide. However, the latter combination is preferred in most cases.

One of the most important conditions is obviously the ratio of sodium gluconate to caustic. The data in Table II seems representative of the data showing the weight ratio of sodium gluconate to caustic soda should be between about 2:1 and about 5:1. Preferably, it should be about 3:1.

The concentration of the combination is also important. The total concentration of the salt and caustic should be between about 10 percent and about 30 percent by weight, preferably about 20 percent. If much less than 10 percent of the combination is present, the amount of chemicals is insufficient to dissolve much calcium sulfate. If much more than about 30 percent of the combination is present, the solution seems to become saturated and a precipitate sometimes tends to form. In addition, at higher concentration, a reaction seems to occur between the caustic and the gluconate salt, particularly at high concentrations of caustic. This is possibly a reaction with the hydroxyl groups of the gluconic acid. The reaction reduces, to at least some degree, the solvent action of the combination. In any case, concentrations of very much more than about 30 percent by weight should be avoided.

Impure technical grades of both sodium gluconate and caustic soda can be used. In addition to impurities, other ingredients may be present. For example, it may be desirable to add a percent or two of a dispersing agent such as a sodium lignosulfonate to aid in the solution of the calcium sulfate and to improve the suspension and removal of finely divided undissolved solvents. Wetting agents and interfacial tension reducing agents, such as ethoxylated alkyl phenols, may also be used, particularly if considerable oil is present in the well or in the formation to be treated. An example of such an agent is the reaction product of 10 moles ethylene oxide with 1 mole of nonyl phenol. The water used to dissolve the gluconate and caustic should be as salt-free as possible. A few percent of an alkali metal salt such as sodium chloride does little harm, but higher concentrations of salt can limit calcium sulfate scale solubility. Polyvalent metal salts, such as calcium, magnesium and iron, should be avoided since they react with the sodium gluconate, thus reducing its effectiveness.

Small amounts, such as about 5 percent of other hydroxy carboxylic acids, such as hydroxy acetic, citric, or the like, can also be included. This is particularly true if an acid treatment is to follow the scale removal treatment to dissolve the calcium carbonate portion of the scale together with iron compounds, such as the sulfides and oxides.

In preparing a solution of sodium gluconate and caustic soda, the undesirable side reactions of these materials at high concentrations should be kept in mind. If the sodium gluconate is dissolved first in the water and the solid caustic soda is then added, the undesirable reaction takes place to a considerable extent between the salt and the high concentration of sodium hydroxide around the dissolving solid particles of caustic. It is best if the sodium hydroxide is dissolved first in all the water to form a solution as dilute as possible to achieve the final concentration of not more than 30 percent. The sodium gluconate is then dissolved into this dilute caustic solution. It is also possible to use aqueous solutions of both materials. This latter technique is particularly desirable if the treating solution is to be prepared by use of gluconic acid and caustic rather than by use of pre-formed sodium gluconate and caustic. It is best not to pre-mix the dry caustic and sodium gluconate. Some reaction can occur between the powders especially if even traces of moisture are present. Whether this occurs or not, some reaction does occur between the high concentrations of both ingredients surrounding dissolving particles of the two materials. Solutions of pre-mixed powders do not perform as well as solutions prepared in other ways.

Once the solution is prepared, it is usually simply injected into the zone of the well to be treated, allowed to soak for a few hours, and then withdrawn from the well. The zone to be treated may be in the well itself, or in the formation around the well. The soak time can vary from about 48 hours for temperatures around 80° F. to about 4 hours for temperatures around 150° F. The advisability of using the treatment at temperatures above about 200° F. becomes questionable due to the many reactions of gluconic acid which can take place at higher temperatures to change its effects. Soak times greater than 48 hours and shorter than 4 hours may, of course, be used in many cases. It should be noted, however, that if soaking times very much more than 2 or 3 days are used, a precipitate may begin to form. This is much like the precipitate which forms in shorter times in stronger solvent solutions, such as the 30 percent solution used in Test 17. The volume of precipitate is usually small, but is sufficient to make inadvisable use of soaking times much greater than 2 or 3 days.

If organic deposits, such as paraffin, are present with the calcium sulfate scale, a pre-treatment with a paraffin solvent, such as xylene, carbon disulfide, or the like, may be used. If the scale is known to contain considerable calcium carbonate, a pre-treatment with acid may be advisable. If an acid pre-treatment is used, most of the acid should be removed before the sodium gluconate-caustic soda treatment to avoid neutralizing the caustic. This can usually be done by producing the well until the pH of produced water rises.

Treatment with an organic solvent or acid, or both, can also follow the treatment to remove calcium sulfate scale. In this case, the well should be produced until the pH drops before the acid treatment. As previously noted, the acid may be used not only to remove carbonates, but also iron compounds, such as sulfides and oxides, so such a step may sometimes be used. However, the principal advantage of my process lies in its use as a single step calcium sulfate scale treatment without a following acidizing step.

The solvent may be injected all at once or in slugs. Preferably, each slug is allowed to soak for several hours before the following slug is used. The first slug may be, and preferably is, removed from the well before the second is introduced. The first slug may, however, be simply displaced back into the surrounding formation. Pressure pulses may be applied to cause the solvent to surge into and out of the formation. Thus, during the soak period, the solvent may not be quiescent but may be agitated.

The volume of solvent to be used is simply enough to fill the zone to be treated. For example, in a well about 10 inches in diameter, about 3 gallons of solvent per vertical foot of well to be treated can be used. If the formation surrounding the well is to be treated, up to about 50 gallons per vertical foot of the zone to be treated can be used.

It is possible to pour or pump the solvent down the annular space between the tubing and casing. It is preferred, however, to pump the solvent down inside the tubing to avoid excessive mixing with, and dilution by, well fluids. A packer may be set between the tubing and casing near the bottom of the tubing string to further decrease mixing.

If desired, a formation surrounding a well may be fractured before or during treatment with the scale solvent. This enhances scale removal at greater distances from the well.

In removing scale from a well bore, a small string shot of explosives may be set off in the well before use of the solvent to loosen the scale and improve contact by the solvent.

After removing the scale, the formation should be treated with a scale inhibitor such as a phosphonate to decrease further scale deposition.

A little sodium gluconate has been used in caustic soda solution for washing bottles. Examples are described in U.S. Pat. No. 2,584,017 Dvorkovitz et al.; U.S. Pat. No. 2,615,846 Dvorkovitz et al.; and U.S. Pat. No. 2,976,248 Otrhalik. This sequestering action is further described in the article entitled "Gluconic Acid and Its Derivatives," by Prescott et al., in the February 1953 issue of Industrial and Engineering Chemistry, p 338–342, inclusive. However, there is no suggestion in references, such as these, that, by using mostly sodium gluconate with a little caustic soda in the 2:1 to 5:1 ratio range, a very superior but inexpensive direct calcium sulfate scale solvent can be prepared for use in wells.

It will be apparent that many alternates and variations are possible in my process. Therefore, I do not wish to be limited to the examples given above, but only by the following claims.

I claim:

1. A process for removing from a well a scale which contains calcium sulfate, said process comprising introducing into said well and into contact with said scale an aqueous solution of gluconates and hydroxides of alkali metals selected from the group consisting of sodium and potassium, the weight ratio of gluconate to hydroxide being between about 2:1 and about 5:1 and the concentration of the combination of gluconate and hydroxide being between about 10 percent and about 30 percent by weight.

2. The process of claim 1 in which said gluconate and hydroxide are sodium gluconate and sodium hydroxide.

3. The process of claim 2 in which said aqueous solution is prepared by first dissolving the sodium hydroxide in the water and then dissolving the sodium gluconate.

4. The process of claim 1 in which said solution is allowed to remain in the well in contact with said scale for a period of time in the range from about 4 to about 48 hours at a temperature in the range from about 80° F. to about 200° F.

5. The process of claim 1 in which an acid treating step is also employed to remove calcium carbonate, iron salts and other acid-soluble materials.

6. The process of claim 1 in which pressure is applied to said solution in said well to force said solution back into the formation to dissolve calcium sulfate scale within flow channels in the formation.

7. The process of claim 1 in which a scale inhibitor is introduced into said well and forced back into said formation after said solution has been removed from the well.

* * * * *